United States Patent [19]

Grollimund

[11] Patent Number: 4,519,680
[45] Date of Patent: May 28, 1985

[54] BEAM CHOPPER FOR PRODUCING MULTIPLE BEAMS

[75] Inventor: Everett C. Grollimund, Midlothian, Va.

[73] Assignee: Philip Morris Incorporated, New York, N.Y.

[21] Appl. No.: 439,587

[22] Filed: Nov. 5, 1982

[51] Int. Cl.³ ..................... B23K 27/00; G02B 27/40
[52] U.S. Cl. ................................ 350/486; 350/6.5; 350/6.7; 350/275
[58] Field of Search ............. 350/486, 274, 275, 6.5, 350/6.7

[56] References Cited

U.S. PATENT DOCUMENTS

| | | |
|---|---|---|
| 2,494,440 | 1/1950 | Haynes . |
| 2,547,623 | 4/1951 | Cockrell . |
| 2,844,648 | 7/1958 | Rosenthal . |
| 3,022,704 | 2/1962 | Cary . |
| 3,024,365 | 3/1962 | Smith et al. . |
| 3,106,642 | 10/1963 | Shapiro . |
| 3,226,527 | 12/1965 | Harding . |
| 3,256,524 | 6/1966 | Stauffer . |
| 3,303,739 | 2/1967 | Chitayat . |
| 3,543,183 | 11/1970 | Heimann . |
| 3,819,277 | 6/1974 | Berthelot et al. . |
| 3,826,578 | 7/1974 | King et al. . |
| 3,901,601 | 8/1975 | Lahmann . |
| 3,965,327 | 6/1976 | Ehlscheid et al. . |
| 3,985,420 | 10/1976 | Grose . |
| 3,993,402 | 11/1976 | Fredrick, Jr. . |
| 4,118,619 | 10/1978 | McArthur et al. ........... 350/486 |
| 4,153,369 | 5/1979 | Kallet et al. . |
| 4,218,606 | 8/1980 | Whitman . |
| 4,224,497 | 9/1980 | Duley et al. . |
| 4,224,498 | 9/1980 | Grollimund et al. . |
| 4,349,719 | 9/1982 | Cashwell et al. . |
| 4,404,452 | 9/1983 | Cashwell . |
| 4,404,454 | 9/1983 | Taylor et al. . |
| 4,410,785 | 10/1983 | Lilly, Jr. et al. . |

FOREIGN PATENT DOCUMENTS

| | | |
|---|---|---|
| 0021165 | 1/1981 | European Pat. Off. . |
| 2439643 | 5/1980 | France . |
| 1400016 | 7/1975 | United Kingdom . |
| 1455327 | 11/1976 | United Kingdom . |
| 2027628 | 2/1980 | United Kingdom . |
| 2032323 | 5/1980 | United Kingdom . |
| 2032325 | 5/1980 | United Kingdom . |

OTHER PUBLICATIONS

Trade Secret Submitted by Applicant and Assignee Entitled "Laser System for Perforating Tipping Paper," 1978.

Klauser, H. E., "Laser Micromachine," IBM Technical Disclosure Bulletin, vol. 21, No. 11, Apr. 1979, pp. 4431–4432.

Primary Examiner—John K. Corbin
Assistant Examiner—Rebecca D. Gass
Attorney, Agent, or Firm—Jeffrey H. Ingerman

[57] ABSTRACT

An apparatus is disclosed for chopping a beam of radiant energy into three or more pulse trains propagating in different directions. The apparatus includes a disc rotating in a plane normal to the incident beam, having a circular pattern of reflective and transmissive portions. The reflective portions include first and second sets of surfaces inclined respectively at first and second oblique angles to the plane of the disc, for reflecting energy in first and second directions.

6 Claims, 7 Drawing Figures

BEAM CHOPPER FOR PRODUCING MULTIPLE BEAMS

BACKGROUND OF THE INVENTION

The present invention pertains generally to beam choppers, and pertains more particularly to systems for chopping a beam of radiant energy into three or more beams of approximately the same strength and cross-sectional size and shape.

Systems for chopping a beam of radiant energy into two or more series of energy pulses are well known. To produce n beams by chopping conventionally requires n annuli of alternating transmissive and reflective segments. The annuli may be disposed on one or on several discs. One system, which uses for this purpose a multiplicity of beam chopping discs each having a single such chopper ring is disclosed in U.S. Pat. No. 4,118,619, issued Oct. 3, 1978. A second embodiment disclosed in U.S. Pat. No. 4,118,619 includes a single disc with a plurality of concentric rings of alternating transmissive and reflective portions. United Kingdom Patent Application No. 2,032,323A, published May 8, 1980, and assigned in common with the present application, discloses another type of beam chopping system, using a disc having a beveled edge which defines the chopper ring, the disc axis being inclined at an angle to the incident beam. A similar system in which the disc axis is parallel to the beam is disclosed in published European Patent Application No. EPO 0021165 (PM813D), published Jan. 7, 1982, and assigned in common herewith.

In the known systems mentioned above, it is necessary either to have as many discs as the number of beams desired or to provide at least one disc with several concentric rings of alternating reflective and transmissive portions, as is disclosed in U.S. Pat. No. 4,118,619. As can be seen from that patent, the latter arrangement requires a respective auxiliary mirror to reflect each reflected beam back to the disc for further chopping, introducing serious problems of alignment. It would be desirable to provide a beam chopping system capable of chopping an incident beam into any desired number of chains of energy pulses traveling along different paths, using only a single disc, and avoiding the need for ultra-sensitive alignment of auxiliary optics to which the one-disc, multi-chopper-ring arrangement disclosed in U.S Pat. No. 4,118,619 is subject.

SUMMARY OF THE INVENTION

The principal object of the invention is to provide a simple beam chopping apparatus for producing three or more beams of pulses that avoids the above-described problem of the prior art.

Another object is to provide such an apparatus having means for making the output beams approximately equal in cross-sectional size and shape.

According to the invention, a beam chopping disc is provided with a circular array of identical segments each of which comprises a transmissive portion, a first beveled reflective portion for intercepting an incident beam and reflecting it in a first direction, and a second reflective portion beveled at a different angle for reflecting the incident beam in another direction. Each segment may, if desired, include additional reflective portions beveled at different angles. By providing the disc with n sets of reflective portions beveled at different angles, it is possible to produce n reflected chopped beams in addition to the transmitted beam.

Further in accordance with the invention, a beam trimmer is provided for one or more of the reflected beams, to convert the shape of the reflected beams from elliptical to at least roughly circular.

These and other objects of the invention will be better understood from the following detailed description of one preferred embodiment taken in conjunction with the accompanying figures, wherein like reference characters indicate like elements throughout.

DETAILED DESCRIPTION OF THE PREFERRED EMBODIMENT

Figure 1:
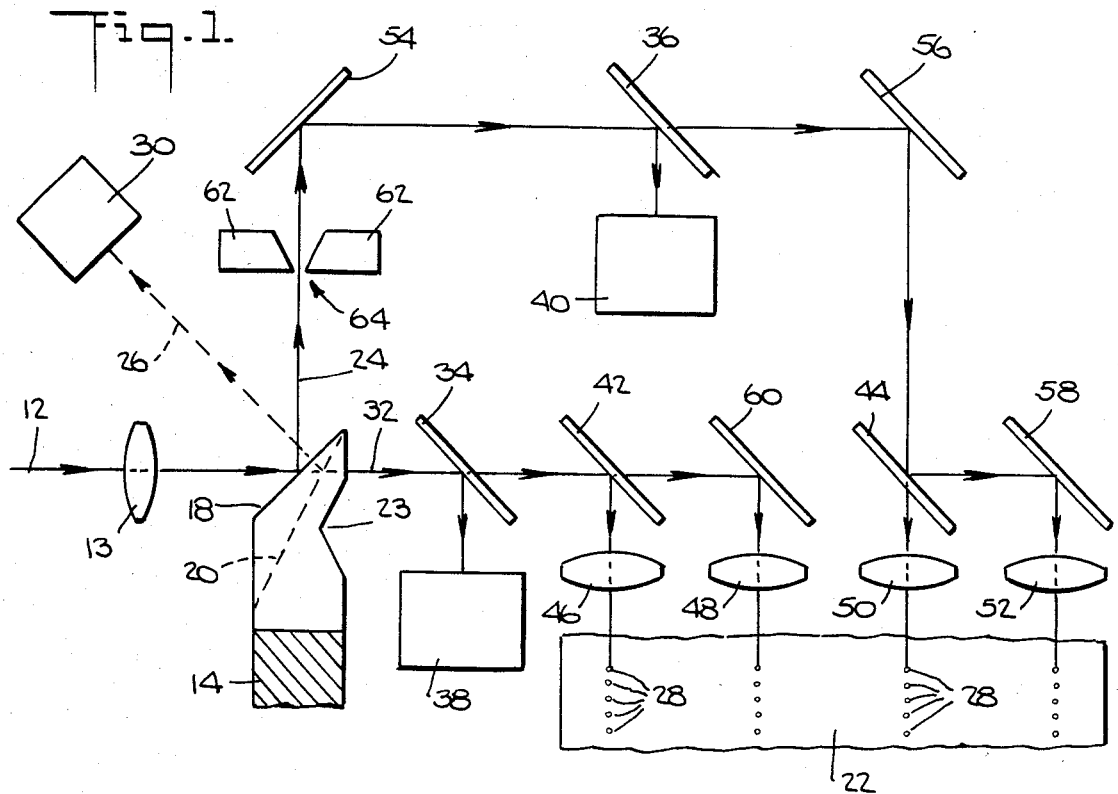
FIG. 1 is a schematic diagram of a beam chopping system including the preferred embodiment of the beam chopping and an associated beam trimmer, constructed according to the principles of the invention.
Figure 2:
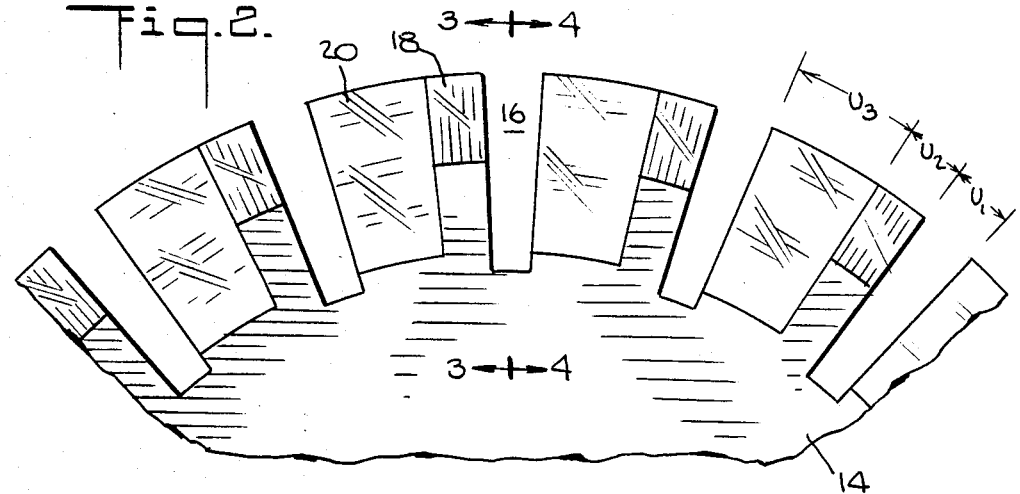
FIG. 2 is a fragmentary elevation view of a portion of a beam chopping disc suitable for use in the apparatus of FIG. 1.
Figure 3:
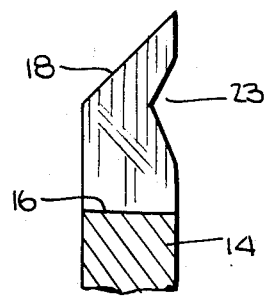
FIGS. 3 and 4 are cross-sectional views of the disc of FIG. 2 taken respectively from section lines 3—3 and 4—4 of FIG. 2.
Figure 4:
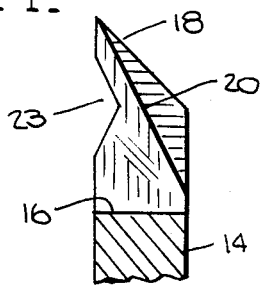

In the beam splitting system shown in FIG. 1, the incident beam 12 is directed at an edge of a rotating chopper disc 14 via a lens 13 that focuses the beam 12 on or near the disc surface. This focusing reduces the required size of each reflective or transmissive region. The portion of the disc 14 at which the beam 12 is directed includes a pattern of transmissive portions and reflective portions. The transmissive portions are preferably slots 16, but alternatively may be apertures or may comprise material transparent to the incident radiation. According to the invention, the disc 14 has a pattern of slots 16 provided evenly spaced about a circular locus, preferably the circumference of the disc 14. Adjacent each slot 16 in the counter-clockwise direction is a first reflective area 18, which is inclined at a first angle to the plane of the beam chopper disc 14. Between each such reflective area 18 and the next slot 16 counter-clockwise is a second reflective area 20, which is inclined at a second angle to the plane of the disc 14. The reflective portions 18, 20 are preferably highly polished so as to be as nearly perfectly reflective as possible. This minimizes the waste of incident energy due to absorption and, in the case of a high energy beam, minimizes damage to the disc 14. An annular portion of the back surface of the disc 14 is preferably recessed as indicated at 23 to reduce the mass of the disc 14.

The transmitted portion of the beam is conventionally used for such purposes as perforating a moving web 22, e.g., of cigarette tipping paper or the like, shown in FIG. 1 moving out of the plane of the Figure. In such applications, the transmitted beam is directed at and focused on the web by means of optics located downstream of the beam chopping disc 14.

When a light beam 12 is incident on the rotating disc 14, the slots 16 transmit the beam, as with conventional beam choppers. The first reflective areas 18 intercept the beam 12 and direct it in a first transverse direction, while the remaining areas 20 direct the beam 12 in a second transverse direction. Each of the reflected beams 24, 26 can then be used for a separate purpose, such as forming perforations 28 in different portions of the moving web 22, or forming rows of perforations adjacent to but off-set from a row of perforations made by the transmitted beam. Each segment of the disc 14, consisting in the preferred embodiment of a slot 16 and two reflective areas 18, 20, thus chops the incident beam by alternately transmitting it, reflecting it in a first direction, and then reflecting it in a second direction. In the system shown in FIG. 1, the second reflected beam 26 is not utilized, but is absorbed by a beam dump 30.

In the system shown in FIG. 1, the transmitted beam 32 and the first reflected beam 24 are each passed through semitransmissive beam splitters 34, 36 to adjust and equalize the strength of the beams. The energy reflected from the beam splitters 34, 36 is absorbed by beam dumps 38, 40. The two beams 24, 32 are each split by an additional beam splitter 42, 44 to produce a total of four beams of equal strength, which are then focused on the moving target web 22 by means of suitable lenses 46, 48, 50, 52. Additional mirrors 54, 56, 58, 60, as shown, are used to direct the beams along the desired paths; the exact paths and downstream optics illustrated are not considered part of the invention but are shown only illustratively.

The circumferential arcs $u_1$, and $u_2$ subtended respectively by the slots 16 and by the first reflective surfaces 18 are preferably equal, so as to produce holes 28 of equal sizes in the web 22, while the arc $u_3$ subtended by each of the second reflective surfaces 20 is selected as a function of the longitudinal distance desired between adjacent holes 28 in the web 22. The relative values of $u_1$, $u_2$ and $u_3$ can be chosen as desired, however, without departing from the scope of the invention.

Figure 5:
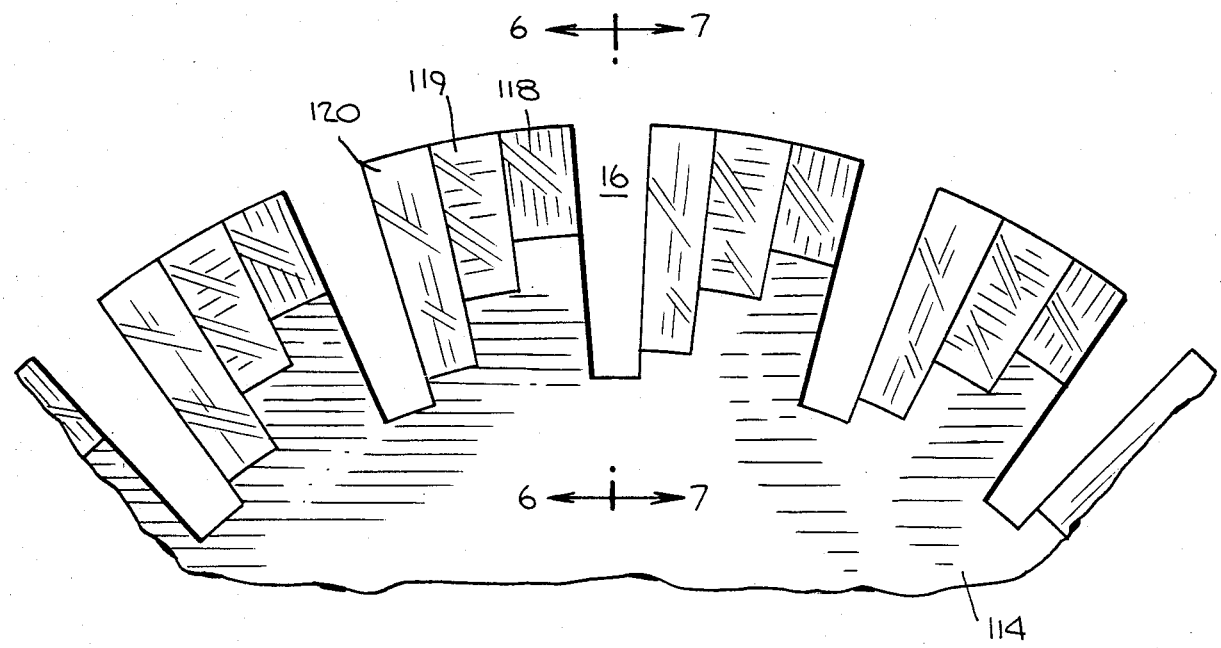
FIG. 5 is a fragmentary elevational view of a portion of an alternate embodiment of a beam chopping disc suitable for use in the apparatus of FIG. 1.
Figure 6:
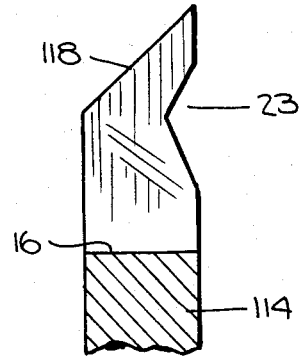
FIGS. 6 and 7 are cross-sectional views of the disc of FIG. 5 taken respectively from section lines 6—6 and 7—7 of FIG. 5.
Figure 7:
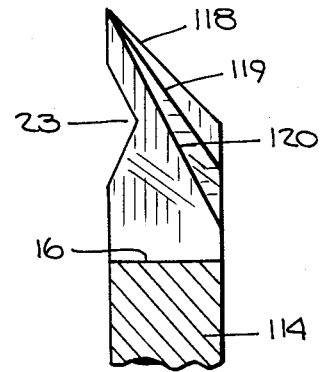

Using the beam chopper of the invention, as many beams as desired can be produced, by providing a suitable number of sets of reflective areas inclined at different angles to the plane of the disc. For example, a disc 114 having three reflective elements 118, 119, 120 inclined at different angles to the plane of the disc, as shown in FIGS. 5, 6 and 7, will produce four beams including the transmitted beam. It will be apparent that the complex auxiliary optics and multiple discs described above in the "Background of the Invention" and conventionally used for producing multiple beams are unnecessary with the beam chopper of the invention.

The reflective areas 18, 20, 118, 119, 120 may be planar, but it is preferred that each set of reflective areas be portions of the surface of a respective cone coaxial with the disc 14. In either case, it will be apparent from considerations of geometry that the shape of the reflected beams 24, 26 will not be the same as that of the incident beam 12 unless the reflective area 18 or 20 that intercepts the reflected beam in question is inclined at an angle of exactly 45° to the incident beam path. If the angle is less than 45°, the reflected beam will have a greater dimension in the direction parallel to the incident beam path than in the transverse direction, while the converse is true if the angle is greater than 45°. In addition, the curvature of the reflective surfaces 18, 20 in the preferred embodiment causes some degree of distortion of the beam cross-section in the transverse direction, although, if the disc diameter is large compared to the beam diameter, the latter distortion is relatively small and can be neglected.

If it is desired that the output beams all have approximately the same cross-sectional shape, as is necessary for aesthetic reasons in such applications as the perforation of cigarette tipping paper, the distortion of the cross section of the reflected beam must be corrected for. According to the invention, this is done by providing a beam trimmer 62 astride the path of the reflected beam 24 to be used. The beam trimmer 62, which is essentially a beam dump shaped and positioned to absorb the undesired portion of the reflected beam 24, comprises a relatively massive block of high specific capacity material with a through aperture 64 having the cross-sectional shape to be imparted to the beam 24. The beam trimmer 62 has as low a reflectivity as possible; this can be achieved by means of a suitable matte coating on the beam trimmer surface 66 exposed to the radiation, or by selection of a material having the desired reflectivity. A cooling fluid is circulated through conventional pipes (not shown) provided in the beam trimmer 62 for that purpose.

The beam trimmer 62 is positioned so that the reflected beam 24 will pass through the aperture 64. The fringes of the beam 24 which overlap the periphery of the aperture 64 are absorbed by the beam trimmer 62, the heat being carried away by the coolant fluid, so that the trimmed beam has approximately the shape of the aperture 64. If only an approximate uniformity of shape is necessary, the aperture 64 may be a slot parallel to the plane of the disc 14 rather than a circle, even if it is desired to impart a circular shape. If the slot is oriented perpendicular to the larger dimension of the cross section of the beam 24, the slot trims off the fringes of the beam 24, while leaving the central portion unaffected. In general, the result will not be exactly circular, but if the noncircularity is acceptable, this expedient reduces the criticality of the position and alignment of the beam trimmer 62.

Since the beam trimmer absorbs part of the energy of the reflected beam 24, beam splitter 34 should be selected to (absorb) reflect more and transmit less incident radiation than does beam splitter 36, to equalize the strengths of the final beams used to produce the perforations 28.

Many variations and modifications of the apparatus disclosed herein will be apparent to those skilled in the art. Accordingly, the scope of the invention is to be limited not by the details of the preferred embodiment described herein, but only by the terms of the appended claims.

What is claimed is:

1. A beam chopper system comprising: a disc having an axis parallel to the path of an incident beam of radiation, said disc being rotatable about said axis; a circular locus on said disc for intercepting an incident beam of radiation and including a plurality of segments, each said segment comprising, in a predetermined order, a transmissive portion, a first reflective portion inclined at a first oblique angle to said axis for directing an incident beam in a first direction, and a second reflective portion inclined at a second oblique angle to said axis for directing an incident beam in a second direction distinct from said first direction.

2. The system of claim 1, wherein each said segment comprises n-1 reflective portions in a predetermined order, n being a natural number greater than 2; each said reflective portion of a given segment being inclined at a different respective oblique angle to said axis, for directing an incident beam in a different respective direction.

3. The system of claim 1, further comprising beam trimmer means intercepting the path of at least one of the reflected beams, for imparting a predetermined shape thereto.

4. The system of claim 3, wherein said beam trimmer means comprises a beam dump having an aperture of said predetermined shape formed therein for passing the reflected beam in question therethrough.

5. The system of claim 1, wherein said predetermined order is the same for each said segment.

6. The system of claim 1, wherein said first reflective portions of said segments lie on the surface of a first conical geometric surface, and said second reflective portions of said segments lie on the surface of a second conical geometric surface.

* * * * *